Figure 1:
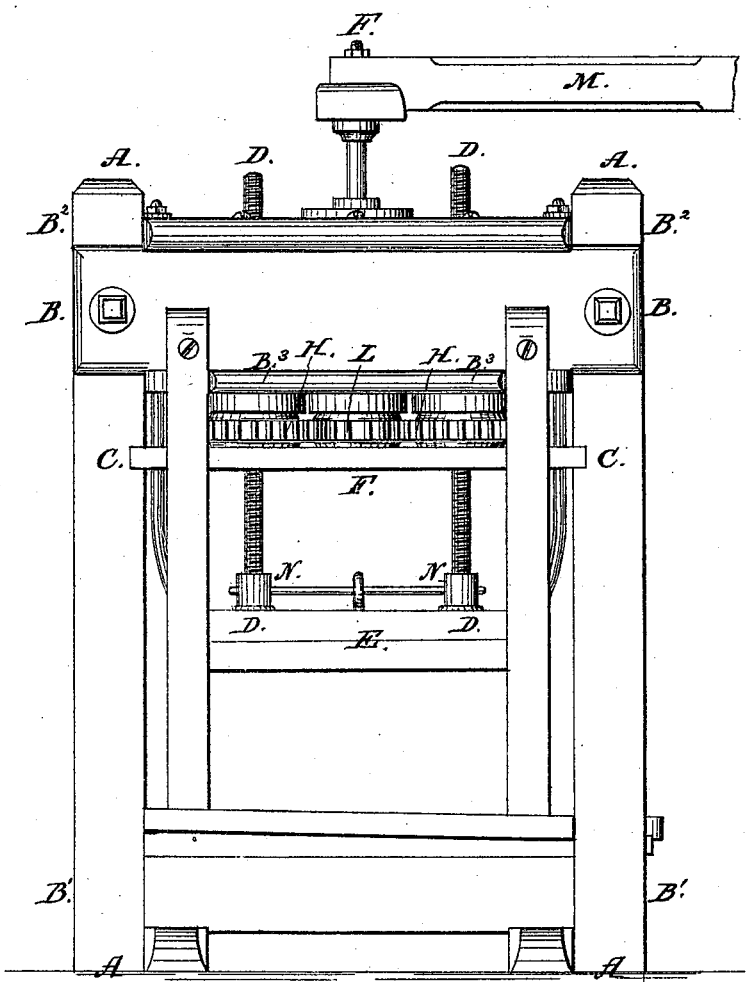

2 Sheets—Sheet 1.

L. O. ROCKWOOD.
CIDER-PRESS.

No. 171,633.　　　　Patented Dec. 28, 1875.

Witnesses:
Edwin Lewis
A. McDougall

Inventor:
Loeing Otis Rockwood

2 Sheets—Sheet 2.
L. O. ROCKWOOD.
CIDER-PRESS.
No. 171,633. Patented Dec. 28, 1875.
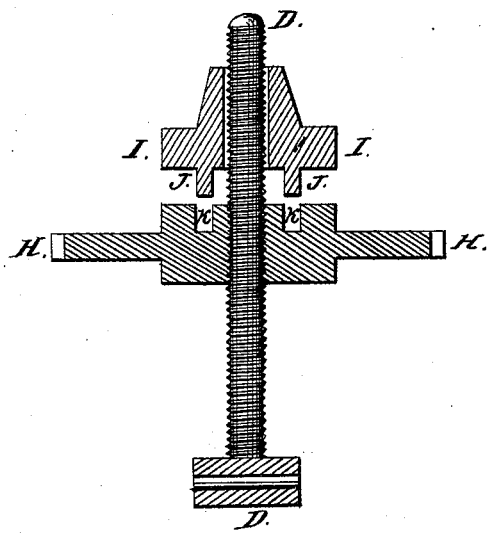
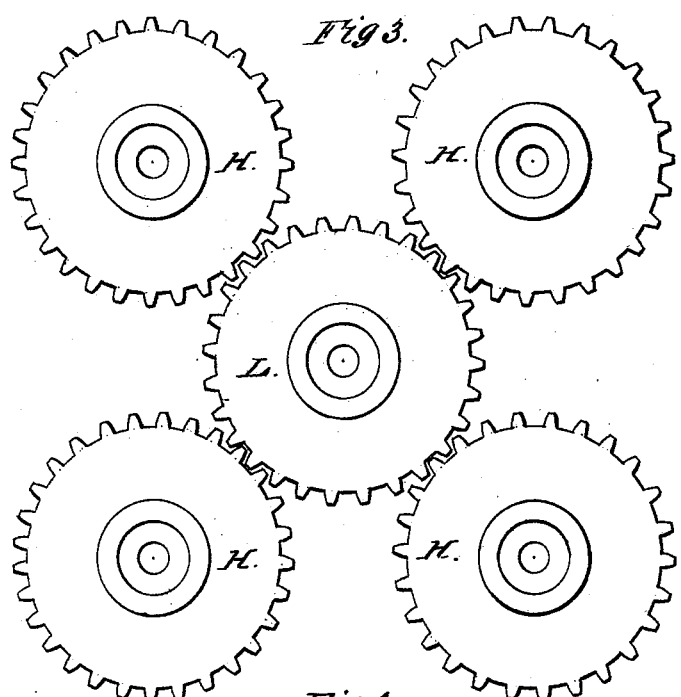
Witnesses:
Edwin Lewis
A. McDougall
Inventor:
Loring Otis Rockwood

UNITED STATES PATENT OFFICE.

LORING OTIS ROCKWOOD, OF OTTAWA, ILLINOIS.

IMPROVEMENT IN CIDER-PRESSES.

Specification forming part of Letters Patent No. 171,633, dated December 28, 1875; application filed May 22, 1875.

*To all whom it may concern:*

Be it known that I, LORING OTIS ROCKWOOD, of Ottawa, State of Illinois, have invented an Improved Cider-Press, of which the following is a specification:

My invention consists, first, in supplying the nuts through which the pressure-screws pass with cogs, so that they can be turned simultaneously by a pinion common to them all, around which they are arranged, this pinion being actuated by a central shaft and sweep. The pressure-screws, being held from turning, are lowered or raised by the revolution of the aforesaid geared nuts. These nuts work against flanged washers, which hold said nuts in their respective centers. The object of this arrangement is, first, to enable the sweep to be operated in a continuous circuit; and, second, to cause this operation of the sweep to force the pressure-screws down or up simultaneously and alike.

Second, in inserting in the midst of the pomace, as the same is built up into a cheese, the perforated tubes or ducts, extending through the cheese to its outside, for the purpose of enabling the cheese to be made to any desired height without increasing the distance the juice will have to percolate through the pomace to find an outlet.

The following is a description of the construction, arrangement, and operation of my improved press.

Four heavy upright posts, A A A A, Fig. 1, are placed one at each corner of the frame. The cross-beams B B and $B^1 B^1$ are framed into each pair of said upright posts, near the top and bottom, as shown in Fig. 1. $B^2 B^2$ is a floor at the top of the frame, formed by the four upright posts A A A A, through the center of which the shaft F passes. This floor fills the inside of said frame. $B^3 B^3$ is a strong solid floor, firmly fastened to the under sides of the two cross-beams B B. A third floor, C C, is built in the frame, about one foot, more or less, below $B^3 B^3$. E is the follower, and D D D D are pressure-screws, extending from the follower, to which their lower ends are fastened, up through the three floors aforesaid. In my press as constructed there are four of these screws, one at each corner of the follower. By having this number the follower may be kept absolutely horizontal while being raised or forced down, and thus the pomace will be pressed with perfect uniformity; but the machine may be constructed with any less number. Between the floors C C and $B^3 B^3$ are the circular geared nuts H H, one of which works upon each of the pressure-screws D D D D. These nuts are substantially spur-gear wheels, working horizontally upon the upright pressure-screws, the holes in the centers of the said nuts, through which the pressure-screws pass, being cut with threads corresponding to the threads of said screws. These geared nuts are arranged upon the floor C C, and between them and the floor $B^3 B^3$ are placed the flanged washers I I. These washers are firmly fastened to the lower surface of the floor $B^3 B^3$. Perpendicular to the lower surface of each of said washers, and extending therefrom, is the circular flange J J, shown in the sectional view of the washer I in Fig. 2. This flange fits into a corresponding groove in the geared nut below the washer, and thus holds said nut firmly in its place, and also permits it to revolve. The aforesaid groove is shown in Fig. 2 at K K. The spur-pinion L, Fig. 3, is keyed upon the upright shaft F F, Fig. 1, near its lower end, and is so placed at the center of the upper surface of the floor C C that it meshes into and turns all the geared nuts H H H H, Fig. 3. The shaft F F, Fig. 1, extends upward through the aforesaid floors to such a height that a sweep, M, may be attached to its upper end, and clear in its revolutions the pressure-screws D D D D when they are at their highest point. N N are rods, extending each through two of the said pressure-screws to prevent them from turning as the geared nuts H H H H are turned. (See Fig. 1.)

In operation, the geared nuts bear against the flanged washers. The revolution of the sweep carries the shaft F F and the pinion L, which latter carries the geared nuts H H H H, Fig. 3. These, in turning, lift or force down the pressure-screws, which carry up and down the follower E.

The perforated tube P, Fig. 4, is a hollow tube, of cylindrical or some other shape, pierced with small holes *t*. After the pomace has been laid up in a cheese to a sufficient height, one or more of these tubes is placed on the top of the cheese, one end extending to the outside surface, and being slightly lower than the other end; then more pomace is laid upon these tubes, and the cheese may be built up to a much greater height. When the pressure is applied the liquor in the upper part of the cheese runs through the small openings into the tubes and out at the outside ends of the tubes, and is not required to be forced clear to the bottom of the cheese. By this means the liquor can be thoroughly extracted from a much larger cheese than can be clean pressed without the use of the tubes.

I claim as my invention—

The vertical shaft F, to which the sweep is attached, in combination with the spur-pinion L, the spur-geared nuts H, the flanged washers I, and the pressure-screws D, substantially as described, and for the purpose specified.

LORING OTIS ROCKWOOD.

Witnesses:
EDWIN N. LEWIS,
D. McDOUGALL.